United States Patent [19]
Gillingham et al.

[11] Patent Number: 5,720,592
[45] Date of Patent: Feb. 24, 1998

[54] STICKER PLACING MECHANISM FOR USE WITH LUMBER STACKER

[76] Inventors: Larry A. Gillingham, 1707 S. Airpark Dr., Veradale, Wash. 99037; Thomas S. Best, 1704 S. Cedar Rd., Spokane, Wash. 99204

[21] Appl. No.: 725,497

[22] Filed: Oct. 4, 1996

[51] Int. Cl.$^6$ ................................................. B65G 57/18
[52] U.S. Cl. .............................. 414/789.5; 414/794.3
[58] Field of Search ........................ 414/789.5, 793.4, 414/794, 794.1, 794.3

[56] References Cited

U.S. PATENT DOCUMENTS

| | | | |
|---|---|---|---|
| 2,861,702 | 11/1958 | Mason | 414/789.5 X |
| 3,904,044 | 9/1975 | Lunden | |
| 4,253,787 | 3/1981 | Lunden et al. | |
| 4,324,521 | 4/1982 | Lunden et al. | |
| 4,671,401 | 6/1987 | Truninger | 198/427 |
| 4,679,381 | 7/1987 | Truninger | 53/447 |

Primary Examiner—Janice L. Krizek
Attorney, Agent, or Firm—Keith S. Bergman

[57] ABSTRACT

A sticker placing mechanism for use with known lumber stackers and perpendicularly associated sticker distribution mechanism provides sticker pans carried by arms of a lumber stacking fork to move downwardly to pick up plural spaced stickers from the sticker conveyor and move the stickers upwardly beneath an accumulated layer of lumber. The layer of lumber and perpendicularly orientated stickers is moved upwardly and forwardly by the stacking fork onto an adjacent stacked lumber package. The stacking fork and associated sticker pans then retract into the stacker while stripping mechanism prevents rearward motion of the stickers and lumber layer to leave the stickers and lumber layer as the top course of the stacked lumber package. In a first species, the sticker pans are immovably carried by the stacking fork arms and moved downwardly by those arms. In a second species, the sticker pans are pivotally mounted on the stacking fork arms and mechanically pivoted for sticker pick up. The sticker placing mechanism is adaptable to retrofitting on existing lumber stackers.

8 Claims, 7 Drawing Sheets

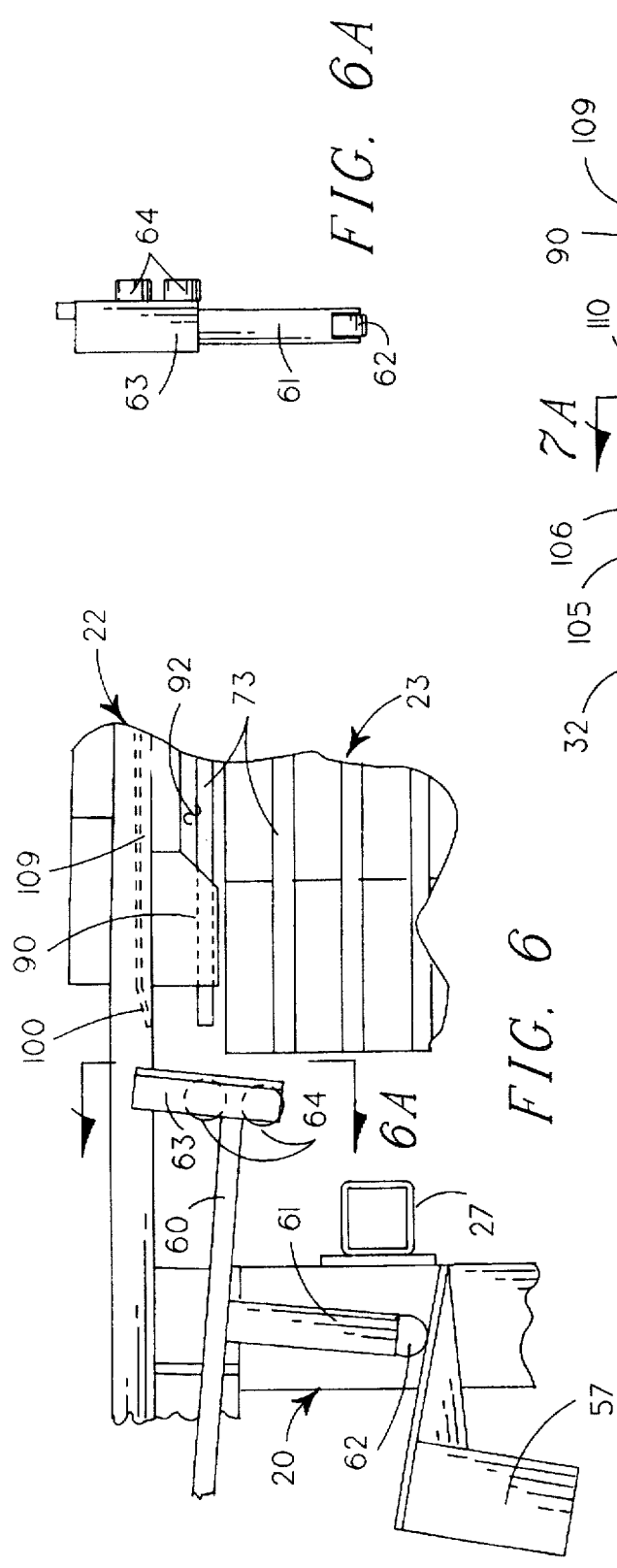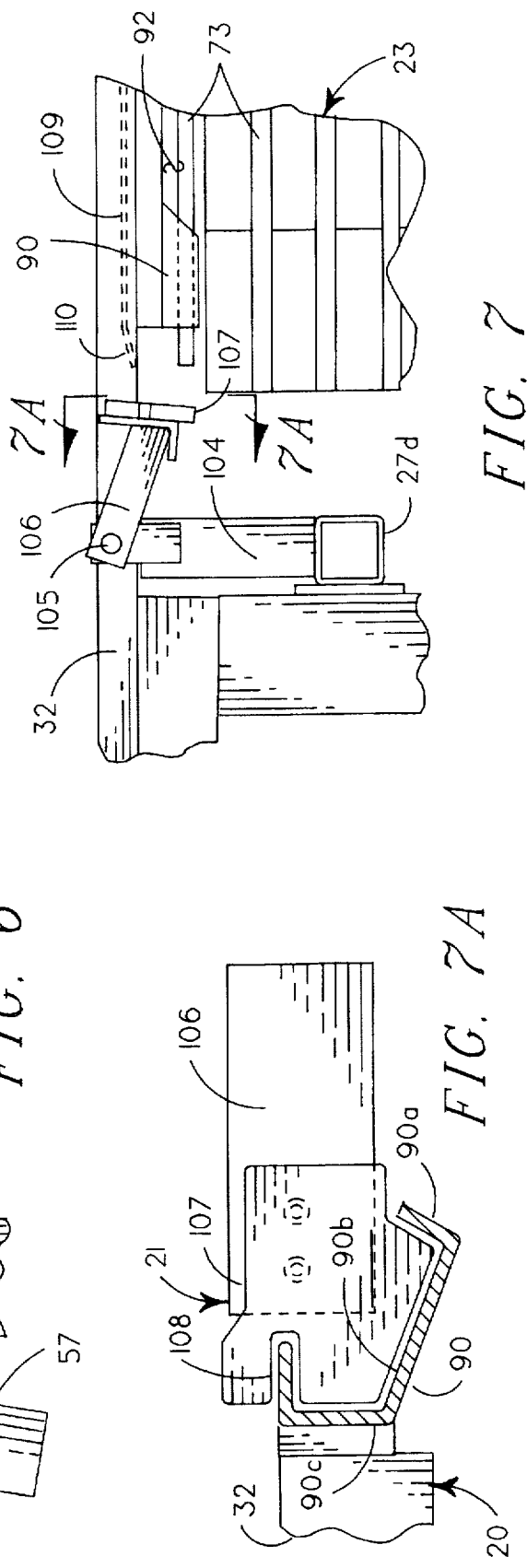

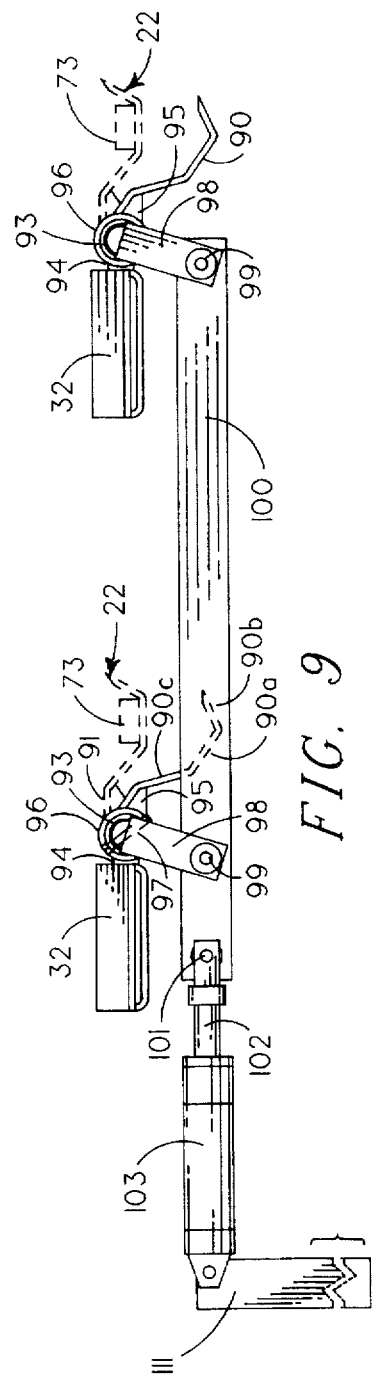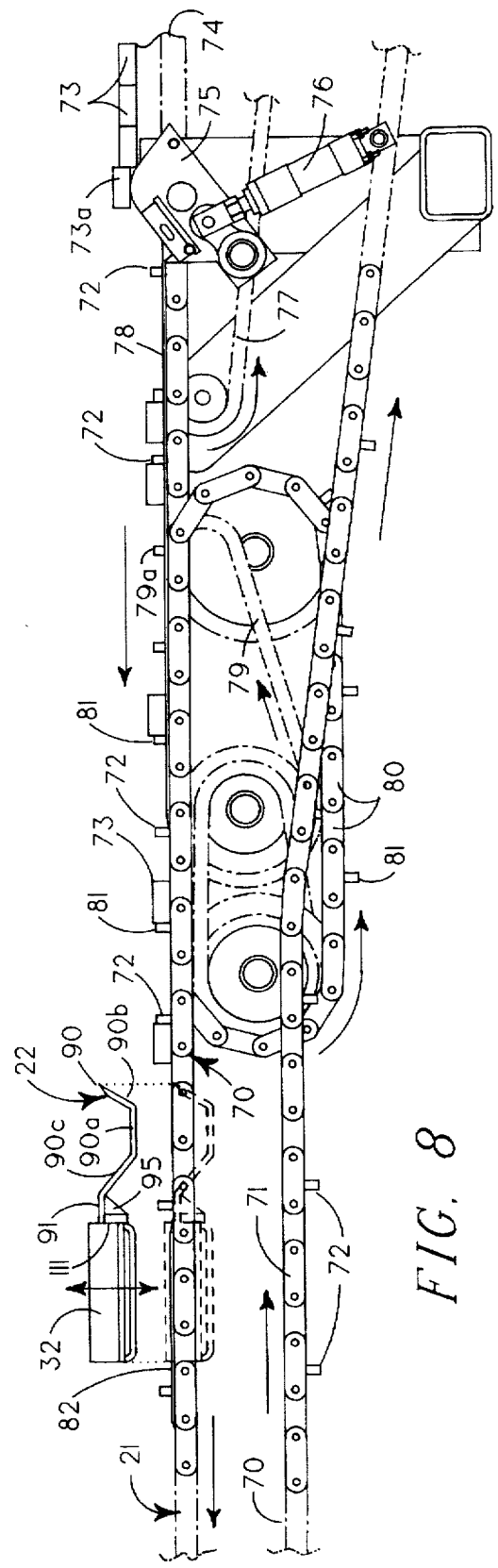
FIG. 9
FIG. 8

STICKER PLACING MECHANISM FOR USE WITH LUMBER STACKER

BACKGROUND OF INVENTION

1. Related Application

There are no applications related hereto heretofore filed in this or any foreign country.

2. Field of Invention

This invention relates generally to lumber stackers, and more particularly to a sticker placing mechanism carried by a stacking fork of the lumber stacker that moves a layer of spacedly arrayed stickers on a conveyor beneath a perpendicular layer of lumber on a lumber conveyor and then moves the lumber and sticker layers over and deposits them onto a stacked lumber package forwardly of the lumber stacker.

BACKGROUND AND DESCRIPTION OF PRIOR ART

In modern milling of both soft and hardwood lumber it is an almost universal practice to place green lumber after cutting in stacked array so that the green boards may be dried by the ambient atmosphere, in a kiln or by both methods. To allow air circulation in a lumber stack to be dried, it is necessary to provide channels for air access and vapor exit. This most commonly is accomplished by forming rectilinear stacks of lumber with vertically alternating layers of green lumber in edge to edge adjacency interspersed with vertically adjacent layers of perpendicularly orientated spaced stickers to provide air channels between the layers of lumber. The instant invention provides a mechanism that operates with known lumber stacking mechanisms and sticker distribution systems to pick up, place and maintain stickers on the under surface of a layer of lumber for stacking in a vertically layered lumber package.

For economic viability in modern lumber milling, product handling must be automated as much as possible. This requirement has resulted in the development and use of stacking machines that automatically create stacked packages of lumber for drying. Such stackers have been known for some time and have become increasingly sophisticated and somewhat standardized in their structures and mechanisms as their history has progressed. The stackers in general provide an upper elongate roller chain conveyor that transports end aligned lumber, usually of a uniform size, to a forward position where a layer of lumber is accumulated against a stop in edge-to-edge relationship in a rectilinear array. This layer of lumber then is raised upwardly and moved forwardly by a stacking fork to a position forwardly of the lumber conveyor where the lumber is deposited as the top layer of a lumber stack that is carried on a pallet that moves vertically so that each successive layer of lumber may be positioned at substantially the same vertical elevation to form a stacked lumber package.

Stickers for such mechanism are commonly moved on a sticker positioning conveyor, in a course perpendicular to the stacker conveyor and in predetermined spaced array, beneath the stacking fork. These stickers then are associated with the lumber layer to be stacked, in some fashion that varies with individual sticker placing mechanisms, so that both the underlying sticker layer and overlying lumber layer may be moved over and deposited onto the lumber stack.

Various mechanisms for positioning, moving and depositing stickers in such stackers have been described in the patent literature, including the instant inventors' U.S. Pat. No. 4,810,152 and patents of Lunden, et al., such as U.S. Pat. Nos. 3,904,044, 4,671,401, 4,324,521 and 4,253,787.

The placement of stickers in a stack of lumber to be dried presents various problems which must be satisfactorily resolved to allow a mechanism accomplishing this function to be commercially viable. Stickers must be spaced from each other by some predetermined distance, usually approximately one to two feet, to allow proper air circulation, but at the same time the stickers in each adjacent layer must be positioned perpendicularly to the adjacent lumber layers and in the same array as stickers of other layers, to present vertically aligned support columns of stickers in a stacked lumber package. If the stickers are not vertically aligned with each other to present such a support column, the lumber supported by them commonly will warp and take a permanent set during the drying process, especially when kiln dried. The stickers themselves, though initially of similar configuration and size, may not retain that configuration and size by reason of breakage, warping, ordinary wear or other hazards associated with their use. An effective stickering mechanism must accommodate any of the common irregularities in stickers and must be generally capable of handling irregular stickers without attendance by workers at, on or in the stacking mechanism.

Most sticker distribution conveyors position stickers at uniformly spaced even foot distances of commonly two feet with soft and some hard woods, and sometimes one foot with other hardwoods. In either case, since the end of a stack nearest the stacker is in a fixed position relative to the stacker, with lumber commonly of even foot lengths this may improperly position one end sticker so that it is not in its desired position immediately inwardly of one end of a lumber layer to be stacked.

The instant invention in addressing these problems provides sticker pans of trough-like configuration carried by a stacker fork having an arm for each vertical column of stickers that is to be placed in a lumber stack. The sticker pans move downwardly prior to picking up stickers from the sticker distribution chain, the distribution chain moves the stickers into their pick up position above the pans, and the sticker pans move upwardly to pick up and move the stickers from the distribution chain into the sticker pan and spacedly above the sticker distribution chain for subsequent forward motion from beneath the lumber conveyor for placement contemporaneously with an associated layer of lumber on a lumber stack. This type of movable pan structure provides a more sure and certain method of picking up, containing and positionally maintaining stickers, especially those of irregular size and shape. A first species of sticker pan is rigidly fastened to the arms of a stacking fork and is moved vertically by the stacking fork. A second species of sticker pan is pivotally mounted on the stacking fork arms and pivotally moved vertically by associated hydraulically powered mechanical linkage.

The desired irregular spacing of one end sticker is accomplished by addition of a sticker advancing chain and retaining lug chain to the sticker distribution mechanism so that the lugs on the sticker distribution chain may be equally spaced but yet one end sticker in a sticker layer may be irregularly spaced. This allows proper positioning of an end sticker and could be used to allow irregular spacing of other stickers if there be reason for this.

Our system also has the additional benefit of allowing use of simple existing control mechanisms that accurately place stickers without cumulative errors because components reset to null positions after each cycle. The system has another benefit of allowing a group of stickers that are positioned for dispersement by the sticker distribution chain to be moved out of the stacker for recycling if a sticker is missing, so damaged as not to be usable, or grossly misaligned. This allows operation of the mechanism by a single operator and does not require workmen to be in, on or about the stacking mechanism during its operation to remove jams, or reposition or replace stickers.

Our invention lies not in any one of these features individually, but rather in the synergistic combination of all of its structures that necessarily give rise to the functions flowing therefrom as specified and claimed.

SUMMARY OF INVENTION

Our invention provides a sticker placing mechanism for a lumber stacker having a top lumber chain conveyor that moves and accumulates a layer of transversely extending lumber in edge to edge adjacency its forward end portion to there be picked up by a stacking fork having plural spaced arms and moved upwardly and forwardly by the stacking fork onto a lumber stack supported on a vertically movable pallet immediately forwardly of the stacking conveyor. An associated sticker distribution mechanism provides a sticker distribution chain extending perpendicularly to and beneath the end of the stacker lumber chain conveyor, below the stacking fork, at the end portion of the lumber chain conveyor where a layer of lumber is accumulated.

The sticker distribution chain has lugs that space stickers at a uniform distance at which they are to be spaced in a lumber package. For proper sticker array, we provide an additional sticker advancing chain and a retaining chain that cooperate with frictional rub bars to allow different, non-uniform spacing of one end sticker in a sticker layer for proper positioning in a lumber stack.

Our sticker placing mechanism interfaces between such a lumber stacker and sticker distribution mechanism by providing a plurality of sticker pans each carried on a lumber fork arm at a position in alignment with the position whereat the sticker is to be placed in a lumber pile. The sticker pans are movable between a first lower position where a portion of the pans extend below an adjacent sticker on the sticker distribution chain and a second upper position where the pans pick up the sticker and move it a spaced distance upwardly above the distribution chain. A first species of sticker pan is fixedly carried by its associated stacking fork arm and moved vertically by motion of the stacking fork responsive to action of camming structure. A second species of sticker pan is pivotally mounted on its associated stacking fork arm to allow pivotal motion in a vertical plane responsive to motion of a bell crank linkage operated by an hydraulically or electrically powered actuator.

In operation, a layer of lumber is accumulated on the forward end of the stacker chain. During such accumulation, stickers are moved to spaced pre-pick up positions along the sticker distribution chain in upstream adjacency to each sticker pan. The sticker pans are then moved to their first lower position and the sticker distribution chain is operated to move the stickers spacedly forward to their pick up position. The sticker pans then are moved to their second upper position to pick up the sticker thereabove which is maintained in each pan immediately beneath the forward portion of the stacking fork. The stacking fork then raises to pick up an accumulated layer of lumber thereabove on the lumber chain and moves forwardly to a position whereat both the layer of lumber and the stickers are over and immediately above a lumber stack supported on a vertically movable pallet. The stacking fork then lowers. Rake-off arms rearward of the stacking fork are activated to prevent both the stickers and lumber layer from moving rearwardly toward the lumber chain, and the stacking fork is retracted for the next cycle while the stickers and lumber are stripped therefrom and maintained on the top of the lumber stack to form its then upper layer. The stacker and sticker distribution mechanism are electrically and hydraulically powered and electronically controlled by known devices to accomplish their functions.

In providing such sticker placing mechanism, it is:

A principal object to provide sticker pans carried on the arms of a stacking fork to move from a first position extending below a sticker on a distribution chain adjacent thereto, to a second position whereat the sticker is carried in the pan spacedly above the sticker distribution chain.

A further object is to provide in a first species of such a mechanism a sticker pan that is fixedly carried by its supporting stacking fork arm and moved vertically responsive to motion of the stacking fork arm, and in a second species a sticker pan that is pivotally carried by its supporting stacking fork arm and pivotally moved in a vertical plane by associated powered mechanical linkage.

A further object is to provide such a sticker pan structure that after loading of stickers is carried by the stacking fork to a position over a lumber package with a lumber layer immediately above the stickers, so that both stickers and lumber are stripped from the stacking fork and onto the upper layer of the lumber stack upon retraction of the stacking fork, to form the top layer of the lumber stack.

A further object is to provide such mechanism that reliably picks up and securely maintains stickers of irregular configurations for accurate placement on a lumber stack so that all sticker columns in that stack will be in substantially vertical alignment.

A still further object is to provide such mechanism that allows automatic removal of a defective set of stickers arrayed on the sticker distribution chain or in sticker pans and replacement by another set of stickers by a remote operator without manual intervention of workmen.

A still further object is to provide such mechanism that may be retrofitted onto existing lumber stackers of the type having a lifting and forwardly extending stacking fork with an underlying traversely extending sticker distribution mechanism beneath the lumber accumulation portion of the stacker.

Other and further objects of our invention will appear from the following specification and accompanying drawings which form a part hereof. In carrying out the objects of our invention, however, it is to be remembered that its accidental features are susceptible of change in design and structural arrangement, with only one preferred and practical embodiment of the best known mode being illustrated in the accompanying drawings as required.

BRIEF DESCRIPTION OF DRAWINGS

In the accompanying drawings which form a part hereof and wherein like numbers of reference refer to similar parts throughout:

FIG. 6 is a somewhat enlarged side view of the lumber rake-off arm structure showing its configuration and operation.

FIG. 6A is a right end view of the lumber rake-off arm structure of FIG. 6, taken on the line 6A thereon in the direction indicated by the arrows.

FIG. 7 is a somewhat enlarged side view of a sticker rake-off arm structure showing its configuration and operation.

FIG. 7A is a right end view of the sticker rake-off arm of FIG. 7, with a sticker pan in operative position therein for sticker rake-off.

FIG. 8 is a side elevational view of the input portion of a typical sticker distribution mechanism showing the association of the first species our lifting pan therewith and our mechanism for irregularly spacing of an end sticker.

FIG. 9 is a side view of the activating mechanism that pivots the second species of pivotally mounted sticker pans from a first downward position to a second upward position shown in dashed outline.

DESCRIPTION OF PREFERRED EMBODIMENT

Figure 1:
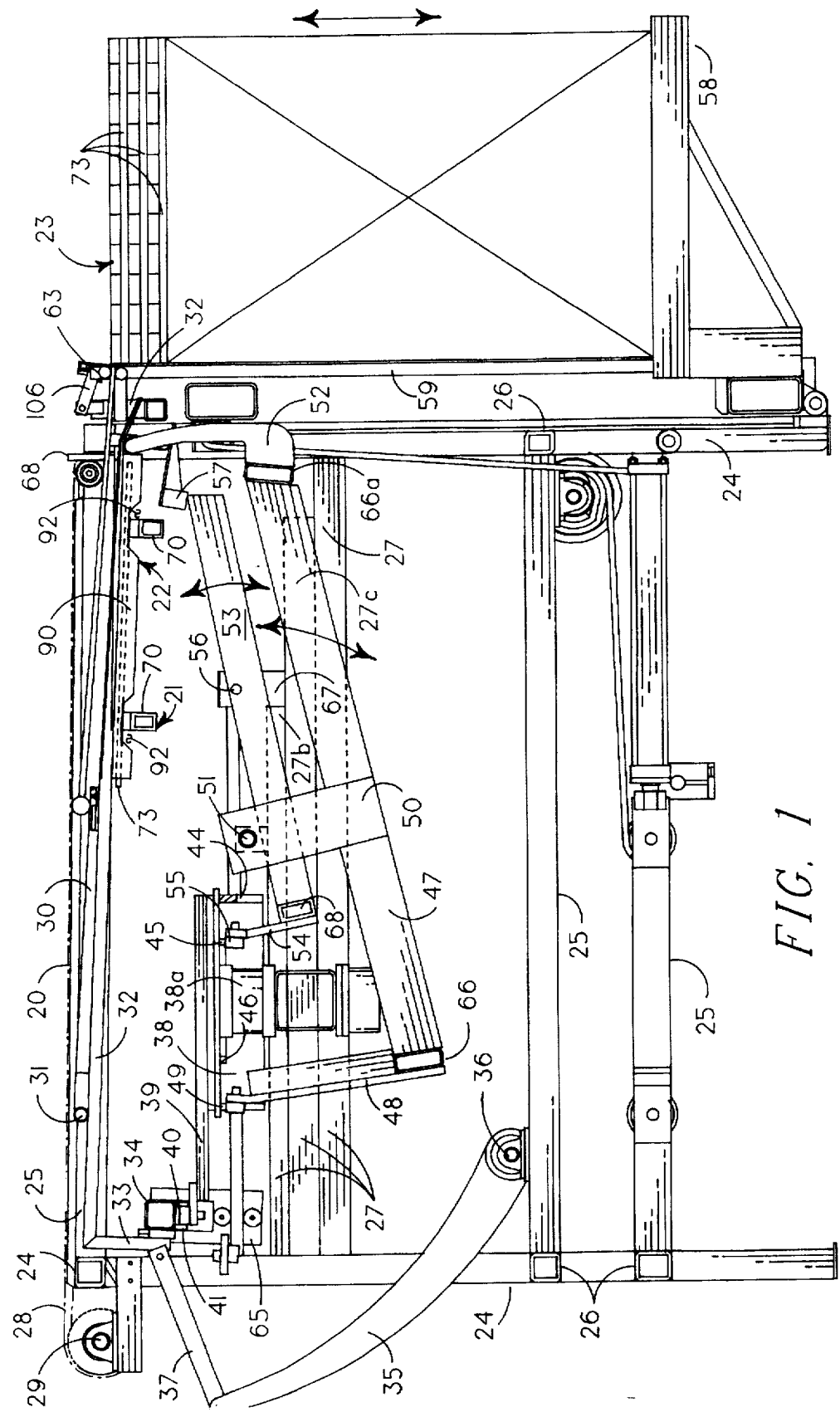
FIG. 1 is a side elevational view of a lumber stacker embodying our mechanism with its stacking fork dipped in a null position for lumber accumulation and sticker loading.

Our invention provides sticker placement mechanism 22 for use with lumber stacker 20 and perpendicularly extending sticker distribution mechanism 21 to form a layer of lumber underlaid by a layer of spaced perpendicular stickers and place such layers on a vertically movable lumber stack 23.

Lumber stacker 20 as seen in FIGS. 1–5 is, in its essence at least, known and used in the present day lumber industry. The mechanism provides a primary peripheral frame defined by structurally interconnected corner posts 24, horizontal side beams 25 and end beams 26 with secondary framework 27 supported on the primary frame as required for support of various components of the stacker.

The top of the stacker frame supports stacker chain 28 driven by powered head shaft 29 to receive lumber in a randomly spaced fashion from an external green lumber chain (not shown) and move the lumber in laterally extending orientation to accumulate in an edge-to-edge array at the forward or right end portion of the stacker chain illustrated. The stacker chain provides two laterally spaced roller chain courses that support lumber near its end portions for conveyance. The stacker chain normally is of a roller type having rollers and side bars supporting and directing motion of the lumber so as to allow an accumulation of a plurality of boards in a single layer in edge-to-edge adjacency at the forward end portion of the stacker chain. Lumber is prevented from moving forwardly of the stacker chain by spaced upstanding course stops 68 carried by the primary frame.

Similar laterally spaced elongate course divider arms 30 are pivotally carried in their rearward end portions by journals 31 laterally of each side of stacker chain 28. The forward portion of the course divider arms 30 pivots upwardly to a position above the top of the stacker chain 28 to divide a layer of lumber that has been accumulated in edge-to-edge adjacency from incoming lumber so that the divided lumber layer is of desired width for stacking. Upon removal of that divided lumber layer the course divider forks return to their null position illustrated in FIG. 1 for recycling.

Stacking fork 32 in the instance illustrated is comprised of similar elongate, forwardly extending lift arms each with rearward perpendicularly depending connection arms 33. The lower end portions of each of the connecting arms 33 is structurally carried by laterally extending stacking fork beam 34 which is supported by articulating linkage 65 for limited pivotal motion in a vertical plane and linear motion in a forward and rearward plane. Paired opposed curvilinear carriage equalizer arms 35, supported on side beam 25 for pivotal motion by journalling structure 36, extend upwardly to pivotally interconnect forwardly extending equalizer arm beams 37 which in their forward portions are pivotally carried by the fork lift support beam 34.

The control mechanism for the stacking fork arms provides cylindrical carriage cam 38 carried in a laterally medial position in the primary frame and mounted in journal 38a for powered rotation by a motor (not shown). The upper portion of carriage cam 38 irrotatably carries diametrically extending carriage crank 39, the radially outer end portion of which journals upwardly extending roller wheel 40 which is carried for linear motion in channel element 41 depending from support beam 34 so that upon rotation of carriage crank 39, support beam 34 will be moved forwardly and rearwardly in a cyclical fashion responsive thereto.

Carriage cam 38 is a peripherally defined circular cylinder with cam surface 44 at its lower edge. The carriage cam 38 carries within its internal channel diametrically smaller, circularly cylindrical lumber rake-off cam 45 defining camming surface 46 at its lower edge. Similar laterally spaced stacking fork rocker arms 47 are interconnected in their rearward portions by laterally extending beam 66 which carries in a medial position perpendicularly upwardly extending cam follower arm 48 which journals wheel type cam follower 49 in its upper end portion to operatively communicate with cam surface 44 of the carriage cam 38. The spaced stacking fork rocker arms 47 each structurally carry in their medial portions perpendicular upwardly extending mounting arms 50 which in their upper portions are pivotally supported on secondary frame elements 27b by journalling axle 51. The forward portions of each spaced stacking fork rocker arm 47 are joined by cross beam 66a which carries two similar laterally spaced, upwardly extending stacking fork lifting arms 52 which articulatingly contact the lower surface of the laterally outer stacking fork arms 32 to move the stacking fork arms 32 vertically responsive to the pivotal motion of the stacking fork lifting rocker arms 47.

Similar laterally spaced lumber rakeoff rocker arms 53 are elongate beams interconnected in the rearward ends by laterally extending beam 68 carrying perpendicularly upwardly extending cam follower arm 54 in its medial portion to journal cam follower wheel 55 in operative position on camming surface 46 of lumber rakeoff rocker cam 45. The medial portion of each lumber rakeoff rocker arm 53 carries journalling pin 56 which is journalled in upstanding support arm 67 which in turn is carried on secondary frame element 27c. The lumber rake-off rocker arms 53 extend forwardly on each lateral side of the stacker to contact lumber rake-off rockers 57 which move vertically responsive to motion of the rake-off rocker arms 53 to prevent lumber from moving rearwardly as the stacking fork 32 is moved rearwardly from beneath a course of lumber and stickers.

The lumber rake-off mechanism is illustrated in more detail in FIGS. 6 and 6A where it is seen to provide two similar laterally spaced rake-off arms 60 pivotally mounted on the stacker frame and extending forwardly from that frame toward the edge of lumber package 23. The lumber rake-off arms 60 each carry depending rocker arm brackets 61 journalling follower wheels 62 carried on each underlying rake-off rocker 57. Elongate rake-off posts 63 are carried in the forward end portions of each rake-off arm 60 to extend on both upper and lower sides of the rake-off arms. The rake-off posts 63 each journal two spacedly adjacent guide wheels 64 to engage both sides of lumber stacking fork arms 32 when those arms are retracted rearwardly toward the stacker so that when the lateral portion of a stacking fork arm is engaged between the guide wheels 64, the rake-off post 63 will be maintained in a vertical position to prevent lumber from moving rearwardly toward the stacker as the stacking fork arms are withdrawn in a rearward direction from beneath a lumber layer as illustrated in the drawing.

Lumber package hoist platform 58 is carried on vertical support 59 spacedly forwardly of the forward portion of the stacker top chain 28. This hoist platform 58 is powered for vertical motion so that it maintains the top layer of lumber in a stacked package 23 at the same elevation by moving downwardly an incremental amount with each successive course of stickers and lumber that is placed upon the stacked package.

The operation of the various elements of the stacker are electrically and hydraulically powered and electronically controlled by known control devices to accomplish the functions indicated.

Sticker distribution mechanism 21 as seen particularly in FIG. 8 is, in its essence at least, known and the type of such mechanism illustrated is in common use with modern lumber stackers. The distribution mechanism 21 is associated with stacker 20 so that the sticker distribution chain 70 extends perpendicularly to the stacker chain 28 at a level spacedly below the stacker chain and in a position beneath an accumulated layer of lumber on the stacker chain that is to be stacked, as seen in FIGS. 1–5 of the drawings.

As seen in FIG. 8 the sticker distribution mechanism 21 provides elongate distribution chain 70 formed by two laterally spaced courses of roller type link chains 71 each carrying paired, opposed sticker lugs 72 for spaced positioning of stickers 73 in a perpendicular laterally extending orientation on the distribution chain. The distribution chain 70 receives stickers 73 from supply chain 74 on which the stickers are accumulated and removed in singulated fashion by a lug loader for placement on distribution chain 70 in spaced array with one sticker 73 between each adjacent pair of sticker lugs 72. This structure in essence at least is common to most sticker distribution systems and generally provides a series of equally spaced stickers for placement in a stack.

We provide additional novel structure for such a distribution chain to allow irregular spacing of one end sticker in a stack. The lug loader provides singulating dog 75 pivotally moved by hydraulic cylinder 76 to load the furthest downstream sticker 73a on the supply chain 74 and move that sticker for loading onto speeder chain 77. The speeder chain 77 carries the sticker 73 downstream and pushes it onto similar paired, laterally positioned drag bars 78 to clear the returning lug loader. The sticker then waits on drag bars 78 until a pair of distribution chain lugs 72 push the sticker onto advancing chain 79 which moves faster than the retaining chain 80 so that it pushes the stickers toward the back of lugs 81 on retaining chain 80. The retaining chain 80 is set for the necessary advance of the sticker so that the first sticker in the lumber stack lines up with its preloading position relative to the first sticker pan. The retaining chain 80 then recedes and leaves the stickers to travel on the distribution chain 70 until they are either picked up by the first sticker pan or are reset forwardly of a distribution chain lug 72 when they encounter the next spaced pair of drag bars 82. In this fashion stickers 73 are spaced along distribution chain 70 at intervals such that they may be picked up by the sticker pans of our invention for placement beneath a layer of lumber to be stacked as hereinafter described. The speeder chain, advancing chain and retaining chain all are laterally adjacent each other and the distribution chain to allow each to operate without interference from others.

The sticker advancing and retaining chains and associated drag bars are provided to allow the first sticker at the upstream end of an array of stickers to be differently spaced from the other stickers in the particular layer, but yet allow the spaces between lugs on the distribution chain to remain the same. This feature allows proper placement of the first sticker in a lumber and sticker layer when the sticker spacing from the upstream side of the lumber layer is less than other sticker spacings to accommodate particular lengths of lumber and yet maintain the first sticker in proper stacking position.

The operation of the various elements of the sticker distribution mechanism are electrically or hydraulically powered and electronically controlled by known devices to accomplish the functions indicated for that mechanism.

The portion of the distribution chain illustrated is not intended to be limiting and its length may be extended to allow positioning of any desired number of stickers on layers of lumber of any practical length. Softwood and some hardwood lumber is commonly stacked with stickers spaced at two foot intervals and with lumber length ranging from eight to thirty feet, so usually not more than about sixteen spaced stickers are required for the largest of any lumber package. Hardwood is usually of lesser length and sometimes stacked with stickers at one foot intervals, which may be accomplished by our mechanism with appropriate adjustment of the size of its elements to allow the required compaction.

Figure 3:
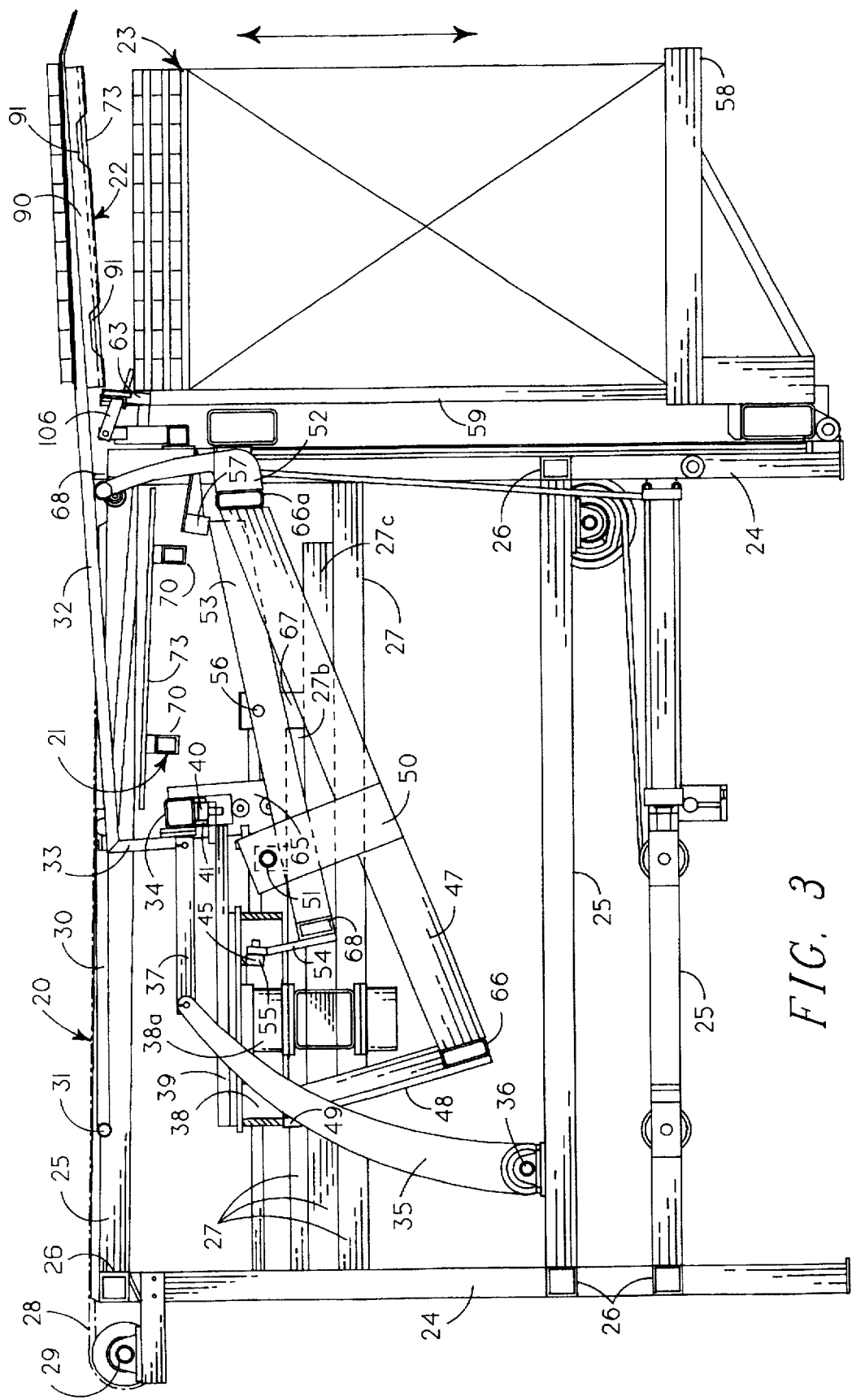
FIG. 3 is a side elevational view of the mechanism of FIG. 1 with the stacking fork fully raised and extended forwardly over a lumber stack for placement of a layer of lumber and underlying stickers on that stack.

Our invention additionally resides in our sticker placement mechanism 22. This mechanism, as seen in FIGS. 8 and 9, provides plural sticker pans 90 carried by an associated stacking fork arm 32 adjacent each position where a sticker is to be placed beneath a layer of lumber to be stacked. Each sticker pan as seen in FIG. 3 is an elongate trough-like structure having bottom 90a with outwardly angulating rearward or upstream edge 90b and forward or downstream edge 90c which interconnects with fastening ledge 91 extending outwardly from the pan substantially parallel to bottom 90a. Two spaced portions of the lower part of the pan are removed to create holes 92 in the pans to allow noninterfering passage of the sticker distribution chain 70 beneath the pans when in lowered position. The sticker pans 90 have a length substantially equal to the length of stickers to be placed thereby, which in most soft lumber stackers is approximately four to eight feet.

In a first species of sticker pan structure shown in FIG. 8, the sticker pan 90 is fixedly mounted in horizontal orientation on bar 111 which is structurally carried by the rearward or upstream side of the associated stacking fork arm 32. The structural joinder of the pan fastening ledge 91 to the bar 111 is aided by plural spaced fillets 95 extending between the two elements. In this first species of sticker pan structure the sticker pan is moved vertically responsive to vertical motion of the stacking fork arms as shown by the alternative sticker pan position illustrated in dashed outline in FIG. 8.

In the second species of sticker pan structure shown in FIG. 9, each sticker pan 90 is mounted on the rearward or upstream side of stacking fork arm 32 by elongate piano-type hinge 93, the alternating elements of which are carried on lift arm brackets 94 and on the forward or downstream edge of fastening ledge 91, as aided by fillets 95 so that the sticker pans may pivot in a vertical plane from the downwardly angled position shown generally in solid outline to the upward horizontal position shown in dashed outline.

One end portion of hinge 93 projects laterally beyond its interconnection with sticker pan 90 to carry collar 96 irrotatably mounted thereon by nut-bolt combination 97 extending therethrough. This collar 96 structurally interconnects radially extending pivot arm 98 in an irrotatable fashion. The pivot arm 98 depends spacedly from collar 96 to pivotally carry connecting pin 99 in its lower end portion. The connecting pin 99 in turn extends through laterally adjacent elongate cylinder plate 100 to pivotally interconnect the pivot arm 98 and the cylinder plate 100. The cylinder plate 100 is pivotally attached by pin 101 journaled in one end portion to piston rod 102 of hydraulic cylinder 103 supported on frame element 111 of stacking fork 32. This mechanism then, by the lineal motion of piston rod 102 in hydraulic cylinder 103, will regulate the angular position of the sticker pan 90. One or more sticker pans may be interconnected in this fashion to the same cylinder plate 100, depending upon the desired sequencing of sticker pick-up as hereinafter described. The illustration of two pans being so interconnected in FIG. 9 is not intended to be limiting.

Figure 5:
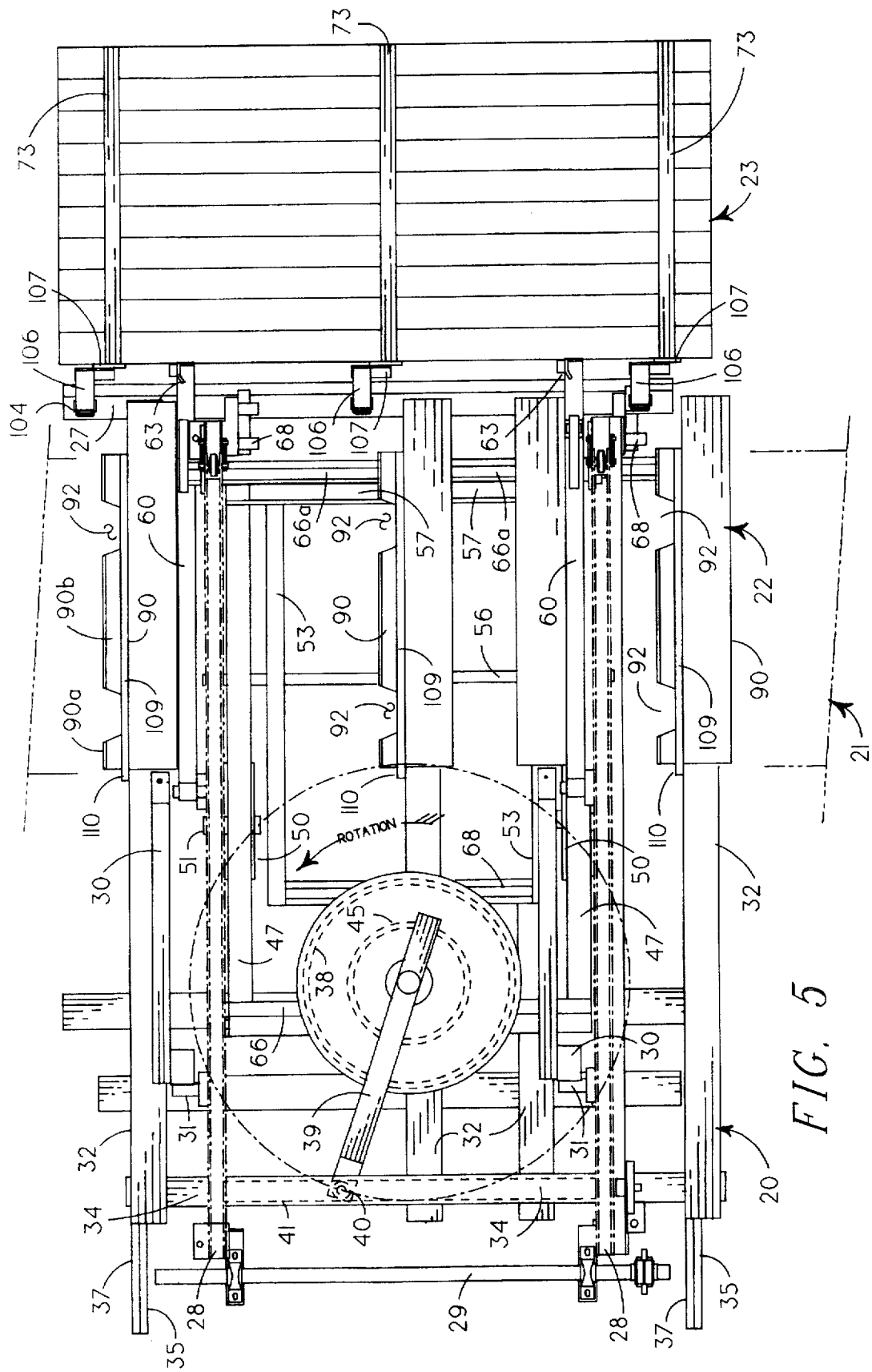
FIG. 5 is a top plan view of the stacking mechanism of FIG. 1.

The sticker rake-off mechanism seen in side view in FIG. 7, is carried on the forward portion of the stacker frame spacedly distant, in an upstream direction from sticker travel, from each sticker pan 90, as shown particularly in FIG. 5. Each sticker rake-off mechanism provides upstanding mounting post 104 carried by the secondary stacker frame element 27d to extend forwardly thereof. The mounting post 104 in turn carries in its upper portion pin 105 which pivotally mounts forwardly extending rake-off arm 106 for limited pivotal motion in a vertical plane. The rake-off arm 106 structurally carries rake-off pad 107 configured, as illustrated in FIG. 7A, to fit within the interior portion of a sticker pan 90 to prevent a sticker from passing rearwardly toward the stacker past the rake-off pad. The upper portion of the rake-off pad 107 defines camming orifice 108 to receive elongate ramp-type cam 109 carried by the upper edge of the inner, supported portion of each sticker pan 90 to extend away from that upper edge and over the trough defined by the sticker pan. The stacker facing end portion of the ramp-type cam 109 provides downwardly angulated entry portion 110 so that as an associated sticker pan 90 is moved rearwardly toward the stacker by its supporting stacking fork, the entry portion 110 of the ramp engages within camming orifice 108 and the rake-off pad 107 is raised and maintained in a raised position so that it clears the lower portion of the rearwardly moving sticker pan, but yet prevents a sticker carried by that pan from moving rearwardly past the rake-off pad 107.

Having thusly described our invention and the structure of a lumber stacker and sticker mechanism with which it is used, the operation of those mechanisms and of our invention may be understood.

The operation of the stacker and sticker mechanisms illustrated and described is hydraulically or electrically powered as appropriate and electronically controlled to accomplish the functions required of the mechanisms' components. The various powering and control devices are known and used in the existing lumber stacking and sticking arts and are not novel in and of themselves.

To begin operation the sticker distribution chain 70 moves forwardly to distribute a plurality of stickers 73 to preloading positions rearwardly adjacent each sticker pan 90 that is being used and upon such sticker positioning the distribution chain stops.

The stacking fork arms 32, which at this point normally are extended into an adjacent lumber package, are retracted out of the lumber package by rotation of the carriage cam 38 which rotates carriage crank 39 to responsively move the stacking arms rearwardly. If the stacking fork arms 32 were supporting a course of stickers and lumber, that material is deposited as the top layer of the stacked lumber package upon the withdrawal of the stacking fork arms from beneath the layer as hereinafter described.

The stacking fork arms 32 when fully retracted are pivoted downwardly, responsive to downward pivotal motion of the stacking fork rocker arms 47 caused by the rotation of carriage cam 38, to place the sticker pans 90 in loading position adjacently downstream of each prepositioned sticker 73 on the sticker distribution chain 70. The carriage cam 38 then stops in its home position as illustrated in FIGS. 1 and 5.

The sticker distribution chain 70 moves forwardly to position each sticker 73 in loading position over its associated sticker pan and upon so doing the sticker distribution chain stops at its home position.

Lumber for a stack layer is then moved forwardly into lifting position on the forward portion of the stacker top chain 28 by motion of that chain and the lumber is there accumulated in edge-to-edge adjacency with ends substantially aligned.

The sticker pans 90 then are moved vertically, from their first lowered position to their second raised position to load the associated stickers into the pans and move them spacedly above the sticker distribution chain 70. In the first species of sticker loading mechanism this motion is accomplished by moving the stacking fork by means of carriage cam 38 from its home position with sticker pans below the stickers to a raised position with sticker pans above the sticker distribution chain. In the second species of sticker loading mechanism the stacking fork is maintained in a home position with sticker pans pivoted downwardly with their sticker facing portions below the associated stickers and the pans are then pivoted upwardly in a vertical plane by sticker pan cylinders 103 to pick up the associated stickers and move above the sticker distribution chain without further vertical motion of the stacking fork.

Figure 2:
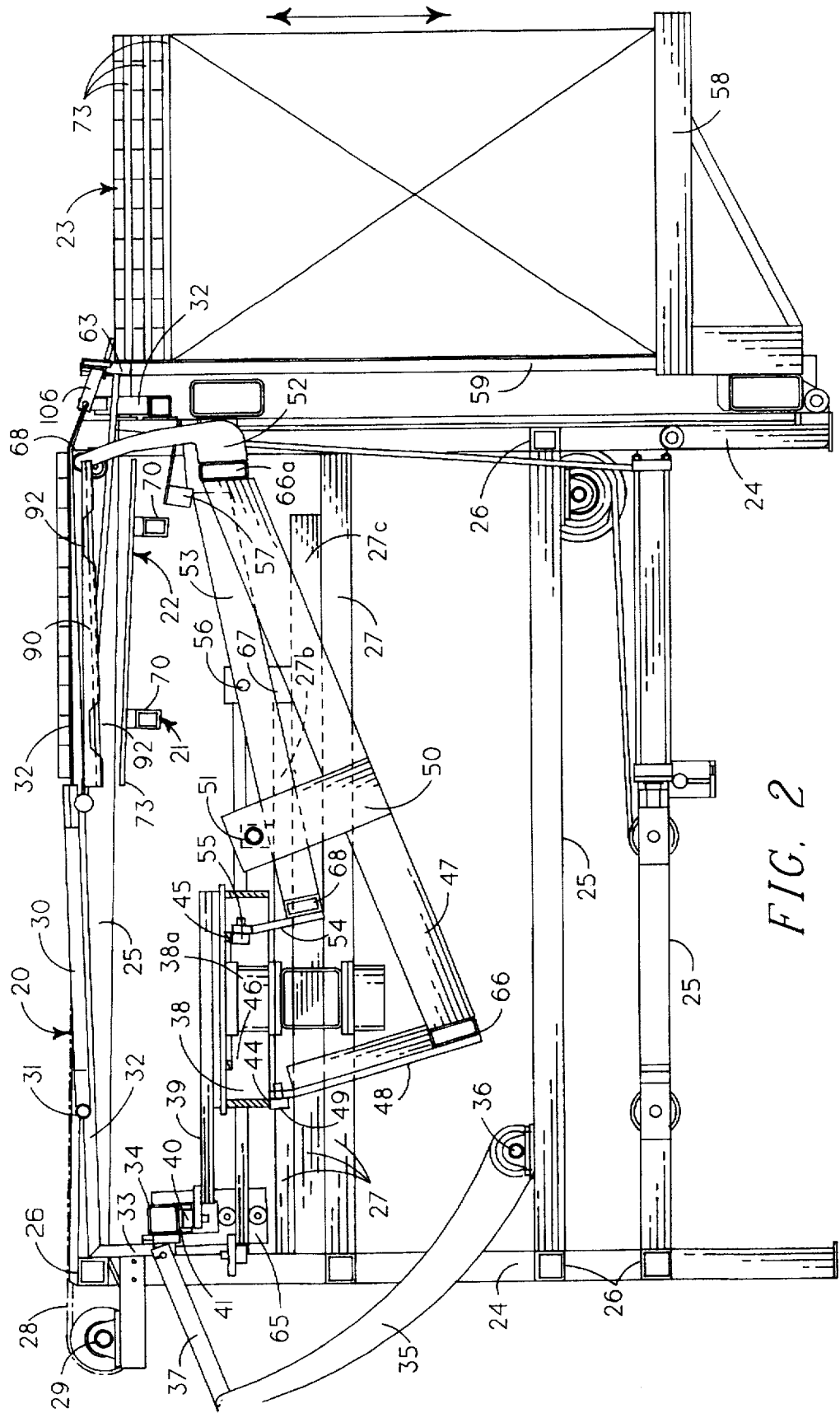
FIG. 2 is a side elevational view of the mechanism of FIG. 1 with the stacking fork partially raised to divide and lift a layer of accumulated lumber from the stacker chain.

The carriage cam 38 and carriage crank 39 then rotate to raise the stacking fork arms 32 under the accumulated lumber course on the stacker top chain 28 for lifting. The course divider forks 30, which hold back excess lumber not included within the particular layer to be stacked, responsively lift their forward portions upwardly to divide the lumber course to be lifted from other incoming lumber as seen in FIG. 2.

The forward portions of the stacking fork arms 32 then are lifted responsive to pivotal motion of the stacking fork rocker arms 47 caused by rotation of the carriage cam 38 and the stacking fork is moved toward the lumber package by further rotation of the carriage cam on a course that is at an elevation sufficient to clear the lumber stops and sticker rake-off mechanisms. The forward motion of the stacking fork continues until the lifted course of lumber and associated stickers are properly positioned over the lumber package being stacked, as seen in FIG. 3.

As the stacking fork arms 32 move forwardly they slide out from under the course divider forks 30 to allow those forks to lower and release lumber on the stacker top chain 28 to proceed therealong to accumulate to form the next course of lumber to be stacked.

The stacking fork then begins to lower when the lumber layer and stickers therebeneath have moved forwardly of the sticker rake-offs and lumber rake-offs to clear those structures.

The sticker distribution chain 70 then operates to distribute the next set of stickers 73 to preloading positions along that chain and the chain then stops.

The stacking fork 32 then lowers, responsive to further rotation of the carriage cam 38 and the pivoting of fork rocker arms 47, to a substantially horizontal position whereat the bottom of the sticker pans 90 is slightly above the top course of the lumber package on which the particular course is to be deposited, preferably at a distance of about three-eighths of an inch thereabove.

Figure 4:
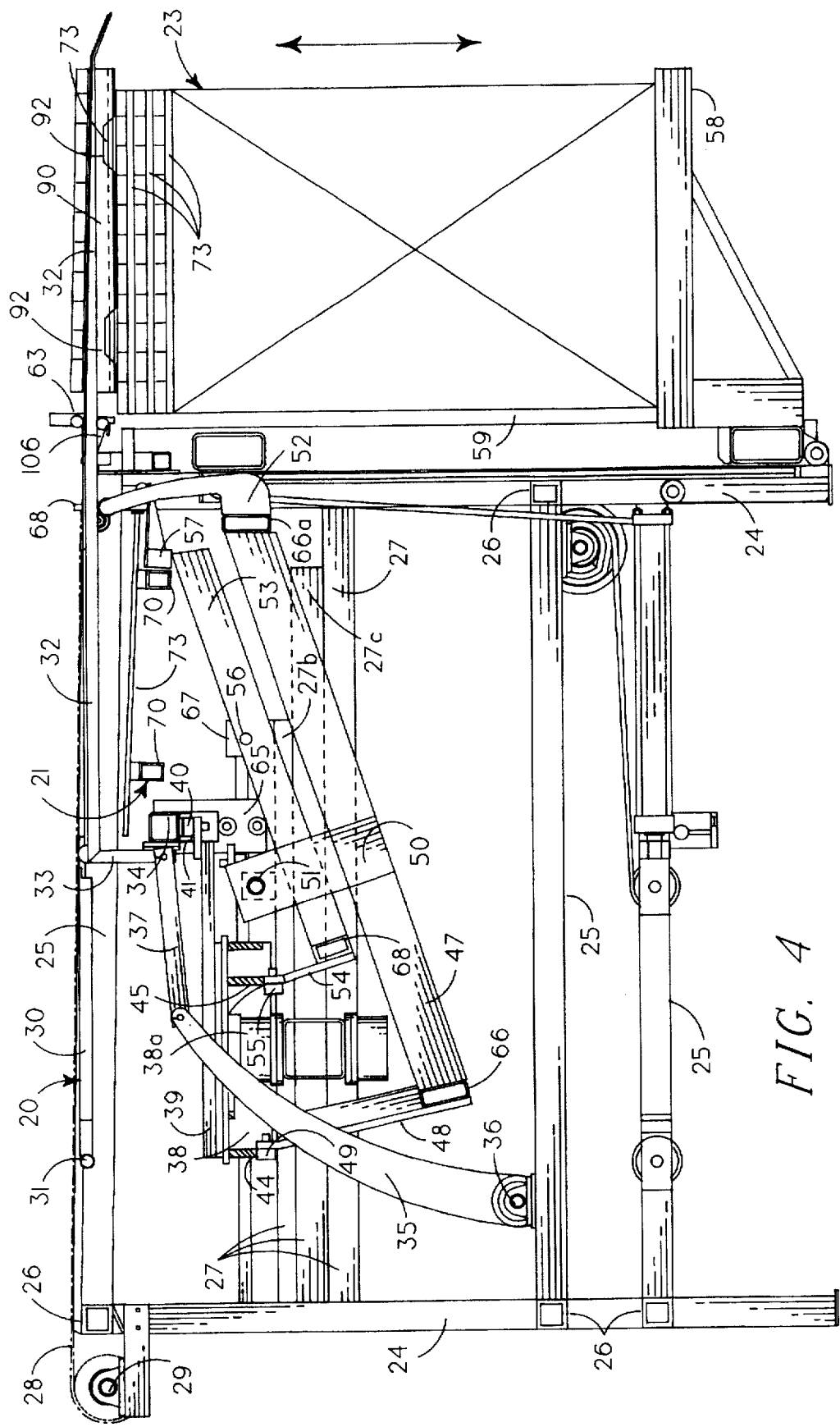
FIG. 4 is a side elevational view of the mechanism of FIG. 1 with the stacking fork lowered onto the top of the lumber stack for stripping of the layer of stack and the underlying stickers on the stack.

The lumber rake-off rocker arms 53 then operate, responsive to rotation of the carriage and position of the lumber rake-off rocker cam 45, to raise the lumber rake-off 57 to a vertical position to stop passage of lumber rearwardly therepast and cause rake-off of the lumber from the stacking fork 32 and onto the underlying lumber package as the stacking fork retracts, as seen in FIG. 4.

The stacking fork 32 then begins to retract responsive to rotary motion of the carriage cam 38 and crank 39 and the sticker rake-off pad 107 slides up the entry ramp portion 110 of elongate cam 109 carried by each sticker pan 90 to the horizontal cam surface to raise the sticker rake-off pad 107 to operative position in the associated sticker pan.

The sticker rake-off pads 107 and lumber rake-off posts 63 are now in proper position to prevent rearward motion of the layer of stickers and lumber as the stacking fork 32 retracts. The stacking fork does retract responsive to further rotation of carriage cam 38 to thereby deposit both stickers and the overlying lumber layer onto the lumber package therebeneath by action of gravity.

The lumber rake-off rocker arms 53 then lower to allow the lumber rake-offs 63 to ride on the surface of the stacking fork arms 32 and follow the contour of those arms in conjunction with the lowering to minimize board disruption such as by flipping.

As the forward tips of the stacking fork arms 32 reach the rearward or upstream edge of the lumber package, the lumber rake-offs 63 drop off their support on the stacking fork arms and drop down to the lumber rake-off null position ready for the next cycle. At about the same time the sticker rake-off pads 107 drop off their camming surface 109 on the sticker pans 90 to drop to a null position to await the next cycle.

After the stacking fork arms 32 retract rearwardly past the end of the lumber package and both sticker rake-off pads 107 and lumber rake-offs 63 are cleared, the stacking fork 32 dips to its null lowered position ready to pick up the next set of stickers and the cycle completed.

It is to be noted with our sticker pan structure that the sticker pans allow positioning of stickers with substantial variance in size and with configurational irregularities without interfering with the operation of the mechanism. Lumber stickers are repeatedly reused and because of such use the stickers often have changed shapes by reason of wear, breakage, stressing forces, or similar causes. This type of irregularity in stickers heretofore has created substantial problems and has jammed prior stacking mechanisms and required individual attention of workers to remedy the problems, all to substantially lessen the efficiency of the operation of such prior mechanisms. Additionally, when a jam has occurred with prior stacker mechanisms, workers generally must go out upon the stacker or sticker mechanisms to remedy the problem and this provides substantial potential dangers for the workmen, especially when portions of the mechanism continue in operation during the remedial work, hut this type of worker activity generally is not required with our mechanism.

It is further to be noted that with our sticker placing mechanism, if a sticker is missing from a position in an individual layer, is radically mis-positioned, or is so damaged that it cannot effectively serve its purpose and if such condition is noticed by an operator during sticker positioning on the sticker chain, the operation of both sticker mechanism and stacker mechanism may be stopped at that point. The sticker distribution mechanism then may be activated by an operator to recycle to position a new set of stickers that would be in proper form and remove the defective set of stickers from the stacker without the direct intervention of a worker and without workmen having to go out onto the mechanism.

It is further to be noted that our second species of pivoting pan mechanism for placement of stickers may generally be retrofitted onto existing stackers and sticker distributing mechanisms of the type described, with only minor modification and without requiring that those structures be specially constructed to accommodate our invention.

It is also to be noted that, though our invention is described with particular reference to the placement of stickers in stacked lumber packages, it also might be used in mechanisms of the type described for placement of spacers, supports or similar elements in stacked arrays of other elongate products such as pipe, structural metal, and the like and that use is within the ambit and scope of our invention.

The foregoing description of our invention is necessarily of a detailed nature so that a specific embodiment of its best known modes might be set forth as required, but it is to be understood that various modifications of detail, rearrangement and multiplication of parts might be resorted to without departing from its spirit, essence or scope.

Having thusly described our invention, what we desire to protect by Letters Patent, and

What we claim is:

1. Sticker placement mechanism for use with a lumber stacker having a top lumber chain that moves lumber to accumulate in a forward end portion of the lumber chain in a transversely extending edge-to-edge layer that is picked up by a stacking fork having plural, forwardly extending, spaced arms and is moved upwardly and forwardly over a lumber stack supported on a vertically movable pallet spaced forward of the top lumber chain, and a sticker distribution mechanism having an elongate sticker distribution chain, extending perpendicularly to and spaced beneath the forward end portion of the top lumber chain, carrying a plurality of selectively positioned, spaced stickers beneath the layer of lumber to be stacked, comprising in combination:

plural elongate sticker pans having a bottom interconnecting outwardly angulated sides to define an upwardly opening trough, each of said sticker pans carried in parallel relationship by one arm of the stacking fork to move from a first downward position with at least a portion of the sticker pan extending beneath an associated sticker on the sticker distribution chain to a second upward position with the associated sticker in the trough defined by the sticker pan and the sticker pan at a spaced distance above the sticker distribution chain;

means for moving the sticker pans between their first and their second positions; and plural sticker rake-off pads movably carried by the lumber stacker adjacent each sticker pan to prevent rearward motion of stickers in the troughs defined by the sticker pans when the pans are moved rearwardly from a position forwardly of the rake-off pads to a position rearwardly of the rake-off pads to cause deposition of the stickers on the top of a lumber stack.

2. The mechanism of claim 1 wherein the means for moving the sticker pans between their first and their second positions comprise:

each sticker pan being fixedly mounted to a stacking fork arm and having spaced portions of the bottom and sides removed to allow the pans to move downward over the sticker distribution chain, with the upper edge of the pans below stickers to be picked up, and the means for moving the sticker pans comprising the vertical motion of the stacking fork.

3. The mechanism of claim 1 wherein the means for moving the sticker pans between their first and their second positions comprise:

pivotal mounting of the sticker pans on the stacking fork arms carrying them by an elongate piano hinge having a hinge portion that is connected to the sticker pan extending beyond a first end of the sticker pan, and a collar irrotatably carried by the piano hinge portion extending beyond the first end of the sticker pan with a radially extending arm pivotally interconnected to a cylinder plate moved by an actuator to cause pivotal motion of the sticker pan in a vertical plane.

4. The mechanism of claim 1 further characterized by the sticker rake-off pads having a portion configured to fit within the trough defined by the associated sticker pan to prevent passage of a sticker in the sticker pan past the rake-off pad, said rake-off pad being movably supported and defining in its upper portion a camming orifice, and each sticker pan having an elongate cam extending over the trough defined by the sticker pan to engage in the camming orifice of the rake-off pad to positionally maintain the rake-off pad to allow the motion of the sticker pan past the rake-off pad.

5. In the sticker placement mechanism of claim 1 wherein said sticker distribution chain has similar laterally spaced courses, each carrying opposed pairs of equally spaced sticker positioning lugs, and a mechanism to position an end sticker in a sticker layer at a variable distance from adjacent stickers, less than the equal spaced distance between positioning lugs on the sticker distribution chain, comprising in combination:

a speeder chain having paired spaced courses laterally adjacent the sticker distribution chain to move stickers from a lug loader onto paired spaced drag bars that positionally maintain the stickers until moved by lugs of the sticker distribution chain;

an advancing chain, moving faster than the distribution chain, having paired spaced courses laterally adjacent to the distribution chain to deliver the stickers to a retaining chain;

said retaining chain having paired spaced courses laterally adjacent the advancing chain and the distribution chain to receive stickers from the advancing chain and deliver the stickers to the distribution chain in predetermined position between lugs carried by the distribution chain; and paired spaced drag bars forwardly adjacent the first sticker pan to frictionally restrain stickers to reposition the stickers to the forward surface of rearwardly adjacent distribution chain lugs.

6. A method for sticker transfer and placement with a mechanism having a lumber stacker with a top lumber chain that moves lumber to accumulate in a forward end portion of the lumber chain in a transversely extending edge-to-edge layer of lumber that is picked up by a stacking fork having plural, forwardly extending, spaced arms and is moved upwardly and forwardly over a lumber stack supported on a vertically movable pallet spaced forward of the top lumber chain, and a sticker distribution mechanism having an elongate sticker distribution chain, extending perpendicularly to and spaced beneath the forward end portion of the top lumber chain, carrying a plurality of selectively positioned, spaced stickers beneath the layer of lumber to be stacked, comprising the steps of:

mounting elongate sticker pans, each having a bottom interconnecting outwardly flaring sides to define a trough, in parallel relationship on at least some of the arms of the stacking fork;

moving the sticker pans from a first position with a portion of the sticker pans extending beneath stickers on the underlying sticker distribution chain to a second position with the stickers in the trough of the sticker pans and the sticker pans spaced above the sticker distribution chain;

moving the stacking fork carrying the sticker pans from an initial position below an accumulated layer of lumber and above the sticker distribution chain upwardly and forwardly over a lumber stack forwardly of the stacker lumber chain;

lowering the stacking fork to a position spaced above the stacked lumber and retracting the stacking fork rearwardly past sticker rake-off pads carried by the stacker to prevent the stickers from moving rearwardly past the rake-off pads and strip the stickers onto the top of the lumber stack;

returning the stacking fork to its initial position; and moving the sticker pans to the initial first lowered position.

7. The method of claim 6 wherein the sticker pans have spaced portions of the bottom and sides removed to allow the top of the pans to extend beneath stickers on the sticker distribution chain, and the moving of the sticker pans between their first and second positions is accomplished by vertical motion of the stacking fork.

8. The method of claim 6 wherein the sticker pans are pivotally mounted on the supporting stacking arms, and the sticker pans are pivoted by a mechanically coupled actuator to move between the first position and the second position.

* * * * *